United States Patent Office 2,735,017
Patented Feb. 14, 1956

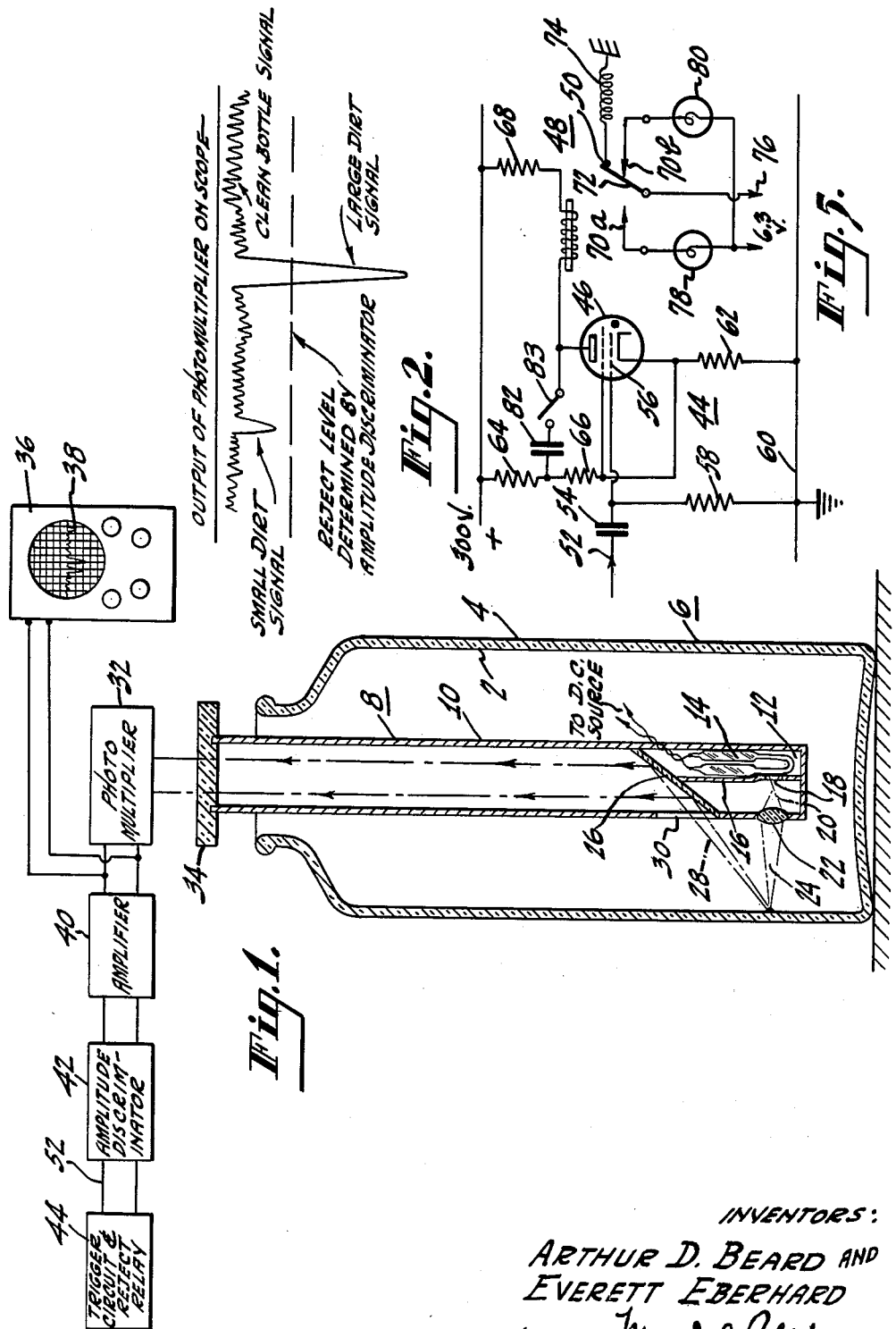

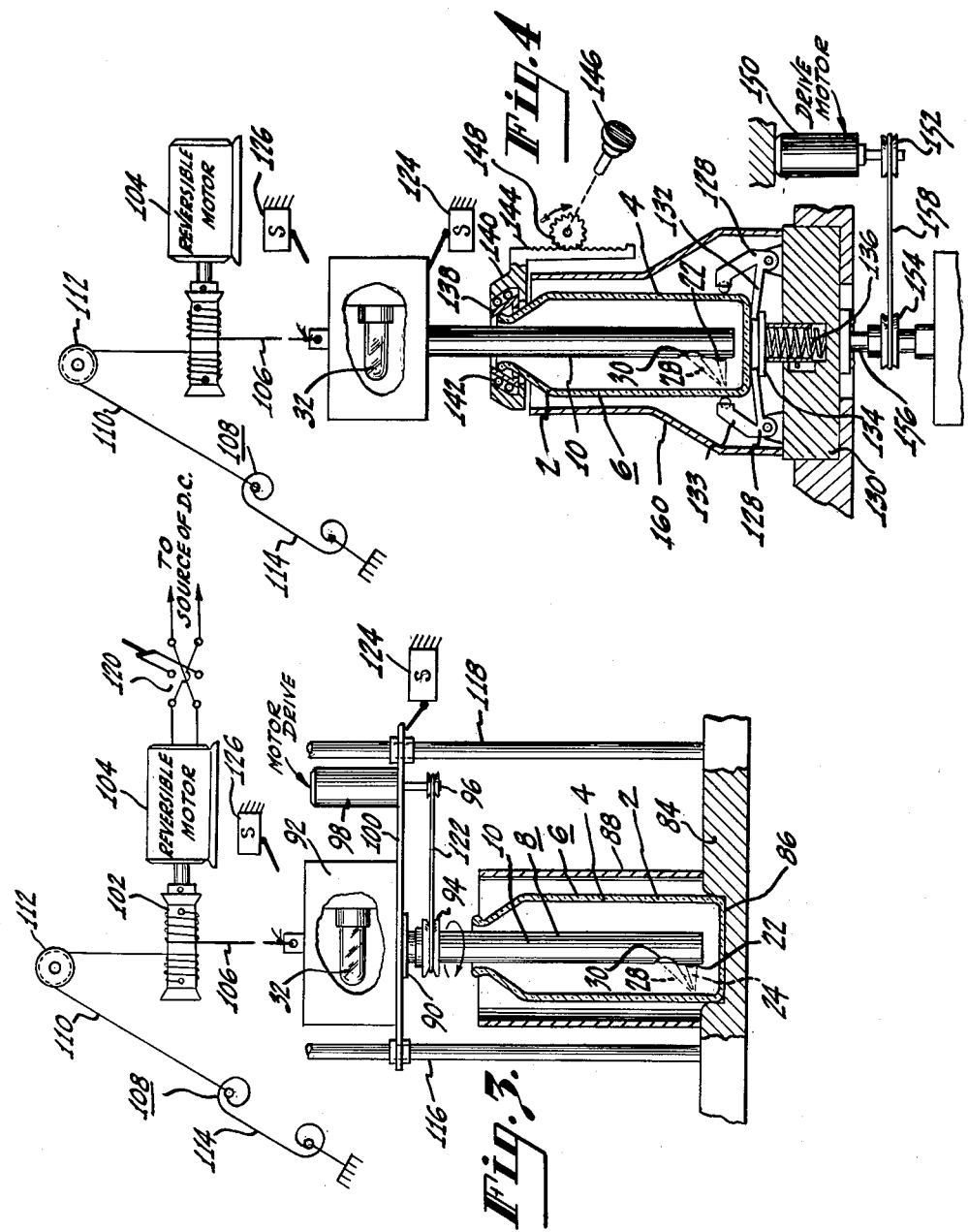

2,735,017

METHOD AND APPARATUS FOR INSPECTING HOLLOW ARTICLES

Arthur D. Beard, Haddonfield, N. J., and Everett Eberhard, Phoenix, Ariz., assignors to Radio Corporation of America, a corporation of Delaware Application February 23, 1951, Serial No. 212,317

13 Claims. (Cl. 250—52)

This invention relates to methods and apparatus for inspecting the interior surfaces of hollow articles. More particularly, the invention relates to an improved system for inspecting the interior surfaces of hollow articles, using a beam of energy and means to detect changes in the intensity of the energy reflected from the surface being inspected.

There have previously been devised various systems for inspecting the contents of a transparent container, such as a bottle, which include directing a beam of light through the container to a photocell located in the path of the light emerging from the container. Systems have also been devised for inspecting the interior of a bore hole in a well drilling operation by directing a beam of ultraviolet light to the wall of the hole and recording changes in the intensity of the reflected light. These latter systems depend upon the fact that certain oil-bearing formations fluoresce under ultraviolet rays and whereby disclose their presence among non-oil-bearing strata.

For a long time, the need has existed in certain industries, such as the bottling industry, for an improved method of inspecting the interiors of washed containers which have been returned for refilling. This problem has been an important one, particularly in milk-bottling plants, since rigid standards of cleanliness must be maintained in order to satisfy public health requirements. Many inspectors have been required, in order to inspect visually the outputs of bottles from bottle-washing machines, since some types of foreign matter adhere so closely to the walls of a bottle that washing machines often do not remove them. Besides the objection of the heavy labor cost involved, visual inspection is often imperfect, due to eye-fatigue of the inspector. Therefore, it has been an objective of the dairying industry, for some time, to have developed a mechanical inspection apparatus which could take over the inspection of the empty bottles in a dependable manner.

There are certain problems, however, in the automatic inspection of empty milk bottles. First, there is the requirement that the inspection means be maintained in a sterile condition at all times so as not to introduce contamination into the washed bottle. Then, there is the problem of inspecting only the interior surface with some means not responsive to reflections from the exterior surface. The exterior surface often has raised lettering, or colored printing, or scuff marks, or a combination of all three, and these would interfere with inspection for dirt. Also, there is the problem of different style containers, such as those which are round in transverse cross section and those of square cross section. Finally, there is always the problem of the presence of widely differing types of contamination to be detected, from adhering tar to a thin, almost invisible, film of dried milk. The present invention is directed to a method and apparatus which solves all of these problems and provides a satisfactory means for inspecting many types of empty containers.

One object of the present invention is to provide an improved method of inspecting the interior surfaces of hollow articles to determine the presence of foreign matter.

Another object of the invention is to provide an improved method of inspecting the interior walls of empty bottles.

Another object of the invention is to provide an improved method of inspecting one surface of a transparent glass article without interference responses from another surface.

Another object of the invention is to provide an improved method of inspecting a relatively large surface photoelectrically.

Another object of the invention is to provide an improved apparatus for inspecting the interior surfaces of hollow articles to determine the presence of foreign matter.

Another object of the invention is to provide an improved apparatus for automatically inspecting the interior surfaces of the walls of empty bottles.

Another object of the invention is to provide improved means for photoelectrically inspecting one surface of a wall of a transparent glass article where the opposite surface of the wall has characteristics which would normally interfere with the passage of a beam of light.

Another object is to provide an easily sterilizable means for inspecting the interior surfaces of food containers.

Another object of the invention is to provide a method and apparatus for photoelectrically inspecting the interior surfaces of hollow articles which may vary in shape.

Although the present invention includes methods and apparatus particularly adapted to inspect automatically the interior surfaces of empty milk bottles or other transparent containers, it includes features adapted to be used in inspecting the interior surfaces of any hollow article. Briefly stated, the invention includes means for directing a beam of energy such as ultraviolet light from within the article to the interior surface, means for scanning the surface with the beam, and means for detecting changes in the intensity of a portion of the beam reflected from the surface. For inspecting transparent containers, an ultraviolet light source was found to solve the problem of eliminating unwanted reflections from the exterior surface of the container, since ultraviolet light does not pass through ordinary glass. It was also found that, if the diffuse reflection, rather than the specular reflection, were directed to the photoelectric means, the same light source and optical system could be used to inspect all containers regardless of cross section configuration.

The objects of the invention will be more apparent and the invention will be more readily understood from the detailed description and accompanying drawings, of which:

Figure 1 is a view including a vertical cross section of a container being inspected and a vertical section of an inspection head, according to the invention, lowered within the container, together with a block diagram of suitable electronic apparatus for interpreting the inspection results, Figure 2 is a trace similar to that which might be observed on the viewing screen of an oscilloscope connected to the output of a photomultiplier tube used in apparatus of the present invention, Figure 3 is an elevation view, partly in section, of one embodiment of inspection apparatus, in accordance with the present invention, including the optical and photosensitive components illustrated in Figure 1, and, in addition, means for applying mechanical movement to these parts, Figure 4 is a view of another embodiment of apparatus according to the present invention, the view being similar to Figure 3 but showing means for rotating the container being inspected rather than the inspection head, and Figure 5 is a circuit diagram of a trigger circuit of a type suitable for use in apparatus of the present invention.

Referring to the drawings wherein like parts have been designated with the same numerals, a preferred embodiment of apparatus constructed in accordance with the principles of the present invention will now be described.

The embodiments of apparatus which will now be described will be those suitable for inspecting the interior surface 2 of the walls 4 of a hollow article such as a glass bottle 6. The inspection apparatus comprises an inspection head 8 including a hollow tube 10 having means, which will be described later, for lowering and raising the tube with respect to the bottle. In a small compartment 12 at the lower end of the tube is located a light source 14. If an article having opaque walls is to be inspected, the light source may be a small incandescent lamp. But, if the article being inspected is a container having walls of ordinary transparent glass, the light source should preferably be one capable of emitting mostly in either the ultraviolet or the infrared range. Ordinary milk bottle glass was found to transmit almost no light below 3000 A.; hence, for inspecting the interior surfaces of empty milk bottles, it has been found highly desirable to use as a light source a low pressure mercury arc lamp, which may be curved in the form of a U. This type of lamp has 90% of its radiation at 2537 A. Nearly all of the light output of this lamp will not pass through ordinary soda-lime glass, most of it being absorbed and some of it being reflected. If an ordinary lamp were used, most of the light would be transmitted through the glass and much of the reflected light would be that reflected at the outer glass-air interface. The outer surface of a container often has raised letters, or other labelling matter, and may also have scuff marks and other imperfections, all of which would cause spurious signals, seriously interfering with the operation of an inspection apparatus of the present type.

The compartment 12 containing the light source is divided from the remainder of the lower end of the tube by a wall 16 which is provided with an aperture 18 permitting a beam of light 20 to emerge from the compartment in a horizontal direction. This beam is focused on the wall of the container by a lens 22 set in the outer wall of the tube 10 and aligned with the aperture. If the light source emits mostly ultraviolet light, the lens 22 should be of quartz. The axis of the light beam 24, emerging from the lens and impinging on the glass, may be normal or substantially normal to the surface, or it may be at any other convenient angle.

In general, there are two components of a reflection that may occur at a surface: a specular reflection and a diffuse reflection. The specular reflection is highly directional in character with the maximum reflection being obtained when the angle of reflection is equal to the angle of incidence. Diffuse reflection is omnidirectional, but, for a smooth glass surface, the diffuse reflection is much less in intensity than the specular reflection.

The presence of dirt on a glass surface exerts opposite effects on these two types of reflections. The specular reflection is always decreased and the diffuse reflection is always increased. Hence, for some types of articles, it would be possible to utilize either one of the two types, in obtaining a signal. But, in the case of empty milk bottle inspection, where some of the bottles may be round and others may be square in transverse cross section, it was found impractical to use the specular reflection due to difficulty of receiving the reflected beam as it sweeps through a widely varying range of angles of a square bottle. For this reason, one aspect of the present invention is the utilization of the diffuse reflection to obtain a signal of the presence of dirt on a smooth surface.

Table 1, below, shows the results of some measurements made on the diffuse reflection obtained from clean and from various "dirt" materials on the same kind of glass.

TABLE I

*Ratio between the diffuse reflections from dirt materials and those from clean glass at 2537 A.*

| Material: | Ratio |
|---|---|
| Clean glass | 1 |
| Grease from a dirty bottle | 17 |
| Paper staple | 15 |
| Mold from a dirty bottle | 12 |
| Solder paste | 23 |
| Masking tape | 20 |
| Grey paint | 11 |
| Very thin milk film | 5 |
| Thick milk film | 8 |
| Chip of glass | 9 |
| Very thin film of dirt found in a bottle | 4 |
| Black deposit found in bottle | 9 |

Continuing to refer to Figure 1, a mirror 26 is set at an angle within the lower part of the tube 10 such that it receives diffusely reflected rays 28 at an angle which is at least 20° removed from the angle of maximum specular reflection. For example, if the axis of the incident beam is 0° to the normal, the mirror should be set to pick up reflected rays at least 20° away from the normal. This is based on the finding that a reflection detector placed 20° away from the angle at which maximum specular reflection is obtained receives only .1% of the specular reflection. The reflected rays enter the tube through an opening 30 directly in front of the mirror.

The mirror is also set to direct the reflected rays which it picks up, up the tube. To increase the transmission of light rays up the tube, the walls may be of polished aluminum since this material is better than most of the usual reflectors in the ultra-violet range. At the upper end of the tube, a photocell 32, preferably a photomultiplier tube, is positioned to receive the light directed up the tube. The IP28 tube has been found to be most sensitive to ultraviolet light at 2537 A.

Where the light source emits mostly ultraviolet light, a small percentage of light in the visible range will also be given off. It is desirable to filter out this visible component of the ultraviolet source and also any stray visible light from the outside before they reach the photosensitive tube. The filter may be any of several well known media for transmitting only light below about 3000 A. In the present apparatus, a double filter 34 was used, consisting of a piece of Corning–9863 filter glass and a 500 gm./liter solution of nickel sulfate contained in a 1 cm. thick quartz cell.

The output signal of the photomultiplier tube varies with the amount of light received by its sensitive surface. The tube may be hooked up directly to an oscilloscope 36 and the output pattern observed on the viewing screen 38. If this is done, a trace will be observed similar to that shown in Figure 2, if the light beam is made to travel over the surface being inspected. The presence of dirt will cause a sudden increase in the signal with the height of the peak thus produced being proportional to the size of the dirt spot. If a certain size dirt spot is arbitrarily selected as the maximum that will be tolerated, a signal level corresponding to the presence of this size spot can be noted on the screen. Then, when a series of bottles is inspected, bottles for which peaks are obtained higher than the tolerance level can be rejected and all others considered as satisfactory.

When a large number of bottles is to be inspected, it is desirable to have a means for automatically indicating which bottles are "good" and which are "bad." This can be done with the aid of conventional electronic circuits.

Referring again to Figure 1, output from the photomultiplier 32 is first fed to a conventional amplifier 40. The amplified output is then fed to an amplitude discriminator 42 of conventional type. An example of a suitable amplitude discriminator is shown and described in the book "Waveforms" edited by Chance et al., Radiation Laboratory, Series No. 19, McGraw-Hill Book Co., Inc., New York, N. Y., 1949, p. 343, section 9.14. Since this type of comparator circuit requires a negative-going signal for proper operation, the amplifier 40 should be a cathode-coupled type in order to preserve the original polarity of the signal.

For convenience in setting the reject level of the inspection apparatus, a potentiometer may be included in the anode circuit of the diode tube which is a part of the above referred to comparator circuit.

When a bottle is being inspected, the presence of a dirt spot causes a positive step to occur in the output voltage of the comparator circuit. The voltage output of this circuit is fed to a thyratron trigger circuit 44, which may be of a type shown in Figure 5.

Referring now to Figure 5, the thyratron trigger circuit may include a thyratron tube 46, such as a 2D21, having in its anode circuit a reject relay 48 operating a pilot lamp indicator switch 50. Output from the comparator circuit 42 is fed through a lead 52 which includes a coupling capacitor 54 to the control grid 56 of the thyratron tube. An input grid resistor 58 is connected between the control grid of the thyratron and a grounded lead 60.

The cathode circuit of the thyratron includes a cathode biasing resistor 62 of small value, connected between the cathode and the grounded lead 60, and a current limiting resistor 64 and a biasing resistor 66 of large value, connected between cathode and screen grid of the tube, and a source of +300 v. supply.

The anode circuit of the thyratron includes the relay 48 and a limiting resistor 68 connected between the anode and the +300 v. supply. The relay operates the switch 50 having a pair of contact points 70a and 70b and an armature 72 normally biased by a spring 74 such that, with no current flowing in the relay, the armature contacts one of the points 70b. In series with the other contact point 70a, not normally contacted by the armature, and a source of low voltage current 76 is a red signal lamp 78. In series with the point 70b, which is normally contacted by the armature, and the current source 76 is a green signal lamp 80.

Between the anode and cathode of the thyratron is a quenching circuit comprising a quenching capacitor 82 and a switch 83 which may be manually operated to open and close the circuit. One side of the quenching capacitor is connected between the cathode biasing resistor 66 and the current limiting resistor 64.

Suitable apparatus for scanning the walls of the article being inspected will now be described although it should be understood that other apparatus may be substituted without departing from the scope of the invention.

In order to scan the interior walls of an article such as a bottle, it is necessary to effect relative rotational movement between the bottle walls and the scanning head and also to effect relative vertical movement between these two components.

Referring now to Figure 3, the bottle 6 may sit on a base 84 where it is firmly positioned by frictional engagement between the lower portion of the outer walls of the bottle and the inner walls of a depressed area 86 formed in the surface of the base.

A light-shielding means such as a cylinder of metal 88 or of other opaque material may be provided around the bottle 6 so that stray light from exterior sources does not interfere with the inspection process. When the source of the inspection light emits in the ultraviolet range and where a filter is also used before the photocell, the light shield is not absolute necessary.

The tube 10 which is a part of the scanning means has its upper end mounted in a bearing 90 so that it may be rotated while the phototube 32 and phototube housing 92 remain stationary. The tube is also provided with a pulley 94 near its upper end so that it may be belt driven from a drive pulley 96 mounted on the shaft of a drive motor 98. The drive motor is mounted on a platform 100 upon which the phototube housing 92 is also mounted. By means of a line switch (not shown) the drive motor 98 may be actuated causing rotation of the tube and scanning head at a predetermined speed depending on the pulley ratio selected. Rotational speed may, for example, be set between 700 and 1000 R. P. M.

Apparatus for raising and lowering the scanning head may comprise a drum 102, a reversible motor 104 having a shaft connected to the drum, for rotating the drum, a cord or chain 106 for suspending the inspection mechanism from the drum, and a tensioning device 108. The tensioning device may include a cord 110 wound around the drum in a direction opposite to that of the cord 106 from which the inspection apparatus is suspended, a suspending pulley 112, and a tensioning spring 114 having one end connected to the cord 110 and the other end anchored.

For guiding the vertical movement of the inspection head and phototube, a pair of guide rods 116 and 118 is provided. These are mounted on the base 84 and extend upward through suitable holes in the platform 100 carrying the phototube and drive motor 98.

Operation of the entire inspection system is as follows: A bottle, the interior of which is to be inspected for cleanliness, is positioned within the light-shielding means 88 to permit entry of the inspection head and tube through its open neck. This step may be accomplished automatically for a plurality of bottles by means of a turret having conventional mechanical loading and unloading means and indexing mechanism, all, for example, as show in U. S. Patent 2,270,613. When the bottle reaches the inspection station, either a mechanically operated or hand operated switch 120 is thrown to operate the reversible motor in a direction such that cord 106 unwinds from the drum and lowers the tube 10 to the bottom of the bottle. Opposing tension on the drum is created by the winding up of the cord 110, on the drum, this cord being held under tension by the spring 114.

As the tube 10 is lowered into the bottle it is being rotated by drive motor 98 through a drive belt 122. This rotates the scanning head sweeping the focused beam of light 24 in a continuous spiral over the inner walls of the bottle.

The mirror 26 in the scanning head picks up only diffuse reflection from the wall of the bottle and directs it to the photomultiplier 32 which is at the upper end of tube 10. As long as the beam sweeps over a clean, unbroken surface, the diffuse reflection remains fairly constant and the photomultiplier output remains at a substantially constant, low level as illustrated in Fig. 2. However, when the beam passes over a dirt particle, or crack in the glass, the diffuse reflection increases and the photomultiplier output jumps to a higher level, the degree of which depends upon the size of the dirt particle.

The photomultiplier output is preferably, although not necessarily, fed to amplifier 40 which may be set to have a gain of 10. The amplified signal is then fed to the comparator circuit 42 and, at this point, may have a strength of about 1 to 5 volts. The comparator circuit is set to respond to a particular level of signal in a manner previously explained. When the "reject level" is exceeded, a positive step occurs in the voltage output of the comparator circuit and this increased positive voltage is applied to the control grid of the thyratron tube in the triggering circuit.

The thyratron is normally biased beyond cutoff, so that the application of the positive voltage pulses causes the tube to fire. Current thus is caused to flow in the output circuit of the tube actuating the reject relay 48. Actuation of the relay pulls the armature of the switch 50 so that it completes the circuit through contact point 70a and red indicating lamp 78. The red signal indicates that the bottle should be removed for further cleaning. The removal may be done manually or by means of a suitable automatic rejecting apparatus, including a memory device such as shown in U. S. Patent 2,270,613. Since the thyratron would normally remain in a conducting state once fired, the circuit is returned to its original state by closing switch 83 thus causing current to flow in the quenching circuit including capacitor 82 and resistor 66. This causes sufficient positive bias to appear at the cathode of the thyratron tube 46 to cut off the tube and stop current flow through the relay, thus causing the switch armature to be pulled back to contact point 70b by spring 74.

The limit of travel of the rotatable tube 10 down within the bottle may be controlled manually by the operator. Preferably, however, automatic stopping and reversal of the inspecting mechanism is utilized. For automatic control, a microswitch 124 is positioned so that it is actuated when the bottom of the platform 100 carrying the phototube housing and drive motor 98 reaches the lowermost point in its path of normal travel. The switch 124 may operate the reversing switch 120 through suitable conventional circuit arrangements (not shown) causing the motor 104 to reverse and the drum 102 to rotate in the opposite direction, winding up the cord 106, unwinding the cord 110, and raising the inspection head and tube out of the bottle. Upward travel may be halted by positioning another microswitch 126 such that it is actuated by contact with the top of the phototube housing. Tripping of the microswitch 126 may be used to throw the reversing relay switch 120 to a neutral position, thus stopping the motor 104.

Another modification of apparatus suitable for use in the invention is illustrated in Fig. 4. In this modification, the tube 10 and inspection head do not rotate while the bottle being inspected is rotated. In this form of apparatus, the bottom of the bottle is held in clamping means comprising L-shaped toggle clamps 128 pivotally mounted on a turntable 130. The clamps have horizontally extending arms 132 and vertically extending arms 133. The L-shaped clamps are mounted such that they open toward each other and such that the free end of each of their horizontal arms 132 rests on a spring-supported disc 134. The spring 136 is mounted within a recessed opening in the center of the turntable.

The neck of the bottle is held by a combination of a rotatable retainer ring 138 of frusto-conical shape, which slips over the neck of the bottle, stationary outer ring 140 also of frusto-conical shape, and a bearing 142 between the two rings. A rack and pinion 144 connected to the outer ring 140, is also provided for raising and lowering the neck holder over the neck of the bottle.

In order to position the bottle for rotation, it is pressed downward on the horizontal arms 132 of the toggle clamps against the upward force of the spring 136. This causes the vertical arms 133 of the toggle clamps to pivot inward towards the bottle and bear firmly against the outer walls of the bottle.

The upper end of the bottle is both held and centered by lowering the retainer ring down over the neck as far as it will go. This is accomplished by rotating a knob 146 which turns a shaft connected to the pinion gear 148 which is a part of the rack and pinion 144. The knob, shaft, and pinion gear are mounted on the stationary framework of the apparatus in any suitable manner (not shown).

When the bottle is positioned properly on the turntable, a drive motor 150 may be actuated by manual operation of a switch (not shown). The motor drives the turntable through a pulley 152 mounted on the motor shaft, a pulley 154 mounted on a shaft 156 extending from the center of the lower face of the turntable 130, and a drive belt 158.

As the bottle is rotated, the tube 10 is lowered and raised to accomplish the scanning of the walls of the bottle, exactly as previously disclosed in connection with the description of the apparatus of Fig. 3. To keep out stray light, a light shield 160 may be disposed around the bottle.

In addition to the specific forms of apparatus disclosed above, it will be obvious to one skilled in the art that various modifications, other than those already mentioned, can be utilized within the spirit of the invention. For example, the tube 10 containing the inspection head may remain entirely stationary during the inspection period. The container may be simultaneously rotated and raised to obtain the spiral scanning motion. Photosensitive devices other than a photomultiplier tube may be used, depending upon the type of light source used, the degree of sensitivity required, and the type of inspection being carried out.

For some embodiments of the invention, the light source may be infra-red or an ordinary incandescent lamp, depending upon the surface being inspected. Any type of light source could be used with the apparatus which has been disclosed for scanning the interior walls of a hollow article.

The light source and the photosensitive component may both be placed at the lower end of the inspection head if a photosensitive device of miniature size is used or if the article being inspected is of sufficient volume and has an opening of relatively large diameter to enable an ordinary phototube to be admitted.

What we claim is:

1. A method of inspecting the interior surface of the walls of an empty glass bottle comprising, directing a narrow, focused beam of ultraviolet light to said surface from a light source within the bottle, picking up only the diffuse reflection of said beam from said surface, directing the diffuse reflection upwardly out of the mouth of the bottle and detecting, at a point outside the bottle, changes in the intensity of said reflection caused by the presence of dirt on said surface.

2. A method according to claim 1 including effecting relative rotation of said beam with respect to said bottle and also effecting relative vertical movement of said beam with respect to said bottle so as to scan the entire circumference of a predetermined zone of said bottle.

3. Apparatus for inspecting the interior surface of the walls of an empty glass container having an open mouth comprising an inspection head, means for introducing said head within said container, means for directing a narrow, focused beam of light from said head to said surface, means within said head for directing reflected rays of said beam upwards and out of said mouth, photoelectric means positioned outside of said container to intercept said directed rays, and means for detecting changes in the output of said photoelectric means.

4. Apparatus according to claim 3 in which said light source is a source of ultraviolet light, substantially all of said light comprising wave lengths impenetrable in said glass container.

5. Apparatus according to claim 4 in which said ultraviolet source is within said head.

6. Apparatus according to claim 3 in which said means for directing reflected rays includes a mirror positioned to receive only light of said rays diffusely reflected from said surface.

7. Apparatus according to claim 3 including means for effecting relative rotation between said beam and said container.

8. In an apparatus for inspecting the interior surface of a hollow article, means including an inspection head for directing a narrow beam of radiant energy from within said article to said surface, means for effecting relative rotational movement between said surface and said beam, and means including a mirror in said inspection head for detecting changes in intensity of energy in said beam after reflection from said surface.

9. Apparatus according to claim 8 including a source of ultraviolet light for generating said beam, substantially all of said beam comprising wave lengths impenetrable beyond said surface.

10. In an apparatus for inspecting the interior surface of a hollow article, an inspection head comprising a hollow tube, means for cooperatively introducing said tube into and removing said tube from said article, a light source positioned in the lower end of said tube, an optical system for focusing a narrow beam of light from said source onto said surface, a mirror positioned in said tube in the path of the reflection of said beam from said surface, said mirror being set at an angle to reflect the reflected rays up said tube, and photoelectric means positioned at the upper end of said tube in the path of said reflected rays.

11. Apparatus according to claim 10 including means for rotating said tube.

12. Apparatus according to claim 10 including means for rotating said article.

13. Apparatus for inspecting the interior surface of the walls of an empty glass container having an open mouth comprising an inspection head, means for introducing said head within said container, means for directing a beam of light from said head to said surface, means within said head for directing reflected rays of said beam upwards and out of said mouth, photoelectric means positioned outside of said container to intercept said directed rays, and means for detecting changes in the output of said photoelectric means, said means for directing reflected rays including a mirror positioned to receive only light from said rays diffusely reflected from said surface, and said means for directing reflected rays also including an aluminum tube having a polished interior surface for conducting rays reflected from said mirror.

References Cited in the file of this patent

UNITED STATES PATENTS

| | | |
|---|---|---|
| 1,947,729 | Morrison | Feb. 20, 1934 |
| 2,133,241 | Baker | Oct. 11, 1938 |
| 2,215,576 | Bucknam et al. | Sept. 24, 1940 |
| 2,334,475 | Claudet | Nov. 16, 1943 |
| 2,381,414 | Wilkie | Aug. 7, 1945 |
| 2,437,916 | Greenwald | Mar. 16, 1948 |
| 2,479,309 | Cave-Browne-Cave | Aug. 16, 1949 |
| 2,481,863 | Owens | Sept. 13, 1949 |

FOREIGN PATENTS

| | | |
|---|---|---|
| 67,017 | Norway | Nov. 1, 1943 |